Nov. 19, 1935.　　　　G. A. LYON　　　　2,021,693
METHOD OF MAKING ORNAMENTAL MEMBERS
Filed Dec. 6, 1934
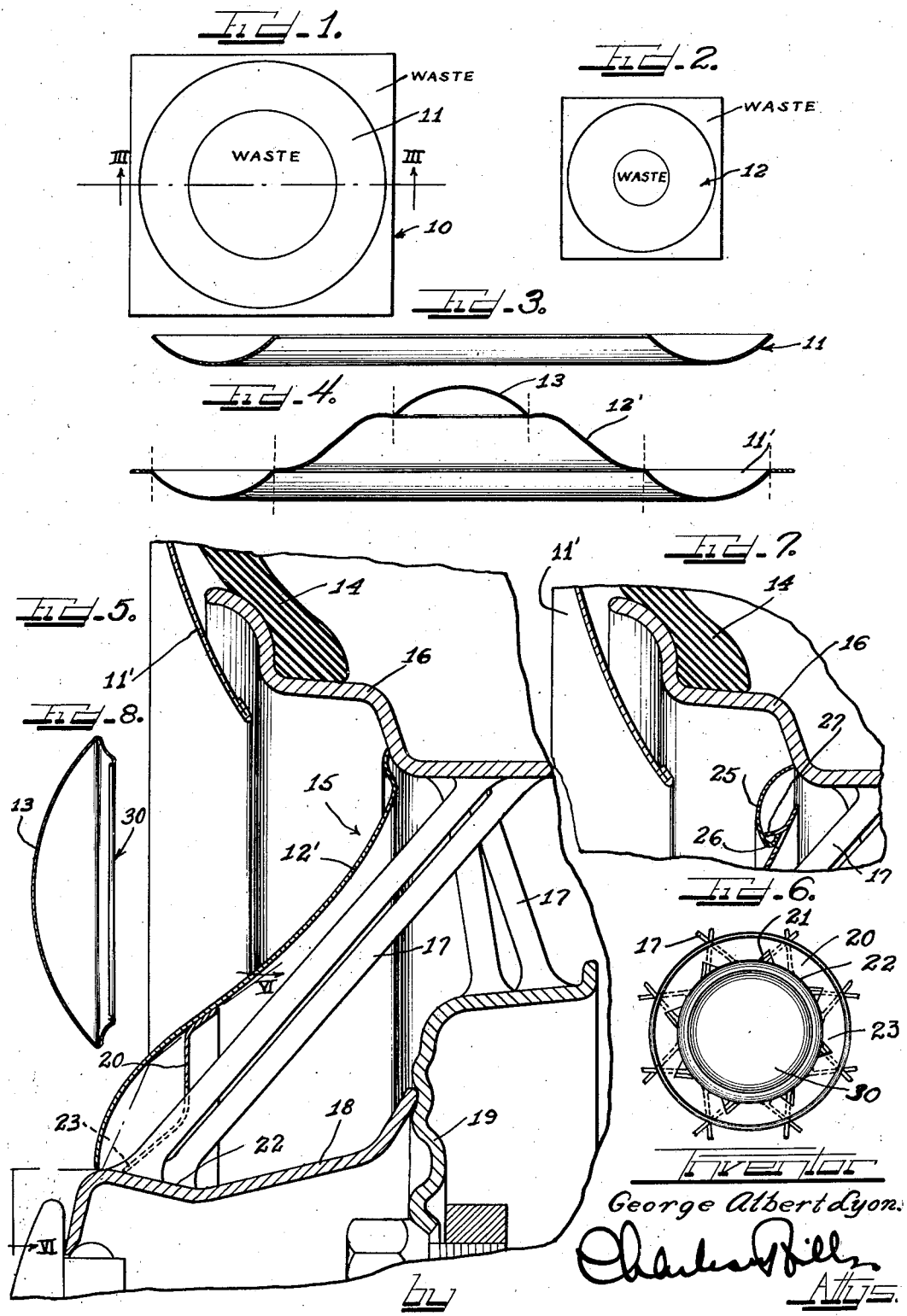

Patented Nov. 19, 1935

2,021,693

UNITED STATES PATENT OFFICE 2,021,693

METHOD OF MAKING ORNAMENTAL MEMBERS

George Albert Lyon, Detroit, Mich.

Application December 6, 1934, Serial No. 756,201

3 Claims. (Cl. 113—116)

This invention relates to a method of blanking a plurality of members from a single blank of sheet material, and more particularly to a method of manufacturing a plurality of automotive vehicle parts such as a tire cover part, a wheel disk part, and a hub cap part, from a single sheet cf material so that the waste incident to the blanking of such parts from said sheet is reduced to a minimum.

Heretofore, in the manufacture of wheel disks for application to an outer side of a wheel, it has been the practice to blank such a disk from a single square piece of sheet material, with the result that the corners and marginal portions of that blank were necessarily discarded as waste material. Naturally, such waste materially adds to the cost of making this wheel disk.

Also, it has been the practice in the manufacture of annular tire cover plates for use in tire covers of the type disclosed in Lyon United States Letters Patent No. 1,807,697, to blank the plate from a square piece of stock, the central part and the corners including the marginal portions of each blank from which the plate is formed being discarded as waste. This waste likewise added to the cost of making the cover plate.

Now, I propose to combine the steps of manufacturing the disk and the tire cover plate together so that both of these parts may be formed at the same time from a single blank of material, and whereby the wasted central portion of the blank used in making the tire cover plate can be formed into the wheel disk, thereby enabling a reduction in the cost of manufacturing both of these parts.

I also intend that, if it is so desired, the innermost part of the portion of the blank formed in the disk may be formed into a hub cap part, where it is not necessary that the disk extend clear across the center of the wheel. This procedure naturally will enable the manufacture of the hub cap part out of material which would ordinarily be waste material.

I am enabled thus to form these members from a single blank of stock by reason of the fact that the outer marginal waste portion of the blank which is to be formed into the cover plate can be used as a means for holding the blank in position while it is formed into a cover plate and its central portion is formed into a wheel disk, or into both a wheel disk and a hub cap part.

Also in accord with the objects of this invention, I provide a method for making wheel disks which, when the disk formed from the blank does not have the requisite overall diameter, may have its diameter increased by the application of an ornamental bead to its outer peripheral portion.

In accordance with the general features of this invention, there is provided a method of manufacturing a plurality of ornamental members from a single blank of sheet material which consists in forming an outer portion of the sheet into an annular tire cover side plate, while the blank is held in position by pressure applied to an outer waste portion of the blank and also while the blank is thus held forming the center portion of the blank into a circular wheel disk, or into both a wheel disk and a hub cap part, and thereafter shearing the parts thus formed so as to disconnect them.

Another feature of the invention relates to the manner in which the overall diameter of a disk thus formed may be increased by the simple action of snapping an ornamental ring-like bead onto teeth punched from the outer peripheral portion of the disk.

Other objects and features of this invention will more fully appear from the following detailed description, taken in connection with the accompanying drawing, which illustrates a single embodiment of the invention, and in which:

Figure 1 is a diagrammatic view illustrating the manner in which a tire cover side plate is at present formed from a blank, and showing the waste;

Figure 2 is a diagrammatic view illustrating the manner in which a wheel disk is blanked from a square piece of sheet material and showing the waste incident to this method of manufacture;

Figure 3 is a cross sectional view taken on the line III—III of Figure 1 looking in the direction indicated by the arrows, and showing the cross sectional shape of the tire cover plate formed from the outer portion of the blank;

Figure 4 is a cross sectional view similar to Figure 3, but illustrating the manner in which my novel method can be carried out so as to form a plurality of parts such as a side plate and a wheel disk or a side plate, wheel disk, and hub cap part, from the single blank of stock shown in Figure 1;

Figure 5 is a fragmentary cross sectional view of a wheel having a tire cover side plate applied thereto, and also showing a wheel disk made in accordance with the features of this invention applied over an outer side wall of the wheel;

Figure 6 is a fragmentary view taken on the line VI—VI of Figure 5, looking in the direction indicated by the arrows;

Figure 7 is a fragmentary sectional view similar to a portion of Figure 5, but illustrating how the diameter of the wheel disk can be increased by the securement of an ornamental bead to its outer peripheral portion;

Figure 8 is a sectional view of a hub cap part which may be formed from the center portion of the blank.

The reference character 10 designates generally, in Figure 1, a square blank of sheet material from which an annular tire cover plate 11 is adapted to be formed. The cross sectional shape of the plate 11 is illustrated in Figure 3, and is of such character that the plate can cooperate with an outer side wall of a spare tire in forming a part of a tire cover of the type disclosed in my issued Patent No. 1,807,697.

In the blanking of this cover plate from the blank 10 on a conventional punch press, the corners and outer marginal portions of the blank, as well as the central part of the blank, are not used in forming the plate, and hence are discarded as waste. This waste, which is indicated in Figure 1, necessarily adds to the cost of the production of the tire cover plate 11.

Also, in the manufacture of wheel disks, such as the one designated generally by the reference numeral 12 in the diagrammatic illustration in Figure 2, the disk is blanked from a square piece of sheet material, leaving the corners and outer marginal portions as a waste product. Moreover, in the event the disk does not extend clear across the center of the wheel, but instead has a central hub cap opening, then the center piece blanked from the disk to form this opening is also waste material. Such waste also increased the cost of manufacturing such disks, which are designed for use over the outer side wall of a spare wheel.

Now, I propose, in accordance with the features of my present invention, to combine the steps employed in making both the plate 11 and the disk 12, so that both of these parts may be produced from a single blank of sheet material with a saving in both material and labor. In other words, I propose to use the center part of the blank to make the disk and the outer part of the blank to make the side plate. During this process of manufacture, the corners and marginal edges of the blank may be held in position on the press while both the tire cover side plate is formed and the center portion of the blank is formed into another part, such as the disk 12', or into two parts, such as the disk 12' and the hub cap part 13 (Fig. 4). In thus blanking the parts from the single sheet of material, spring pads or the like may be used in the press to exert a pressure on the outer edges or marginal waste portions of the blank, while the side plate, disk, and hub cap parts are formed from the blank.

This process enables a saving in the waste material, since the only material that is then wasted is the corners and edges of the blank which are left over after the parts have been formed therefrom.

In carrying out my process, any suitable equipment may be used, such as, for example, a double toggle press, or a press having a compound die formed to apply the necessary pressure to the edges and corners of the blank during the time that the central portion of the blank is being formed into the desired part or parts.

In Figure 4, I have illustrated by dotted lines where the parts can be sheared to disconnect them. The shearing operations may be performed on the press that does the forming, or may be performed on a separate press in a separate shearing operation.

In Figure 5, I have illustrated the manner in which the parts formed from the blank may be used on a spare wheel of an automobile. The tire cover plate 11', of course, will be disposed over the outer side wall of a spare tire 15, positioned on a rim 16 of a wheel designated generally by the reference numeral 15. This rim is connected by the usual spokes 17 to a central hub part 18, which includes a flange 19 adapted to be bolted to a suitable support in the usual way.

The disk 12' formed from the blank may be shaped to the form shown in Figure 5, so that its outer peripheral margin will embrace an inner surface of the rim 16. This disk extends between the rim and the wheel hub and serves to conceal the spokes 17.

In accordance with the features of a separate invention of my own, this disk may be provided with a concealed retaining ring 20 suitably secured to the rear surface of the disk. This retaining ring is made of a resilient material, such for example as sheet steel, and is notched out as indicated at 21 in Figure 6, so as to fit over the outermost set of spokes of the wheel 15, to secure the disk to the wheel.

In applying the disk to the wheel, it is shoved axially over the hub 18 of the wheel so that the inner edge of the retaining ring 20 slides inwardly along the inclined surface 22 of the hub 18. By reason of the notches 21 in this ring 20, the ring is provided with a plurality of yieldable fingers or portions, each of which, as indicated by the dotted lines designated by the reference numeral 23 in Figure 5, is adapted to have its free end tightly grip the inclined surface 22. The angle of each of these fingers with respect to the inclined surface 22 is such that any tendency to dislodge the disk from the wheel only augments the gripping engagement of the surface 22 by the fingers of ring 20.

Now, if it should so happen that the disk punched from the blank does not have a large enough diameter to extend clear across the distance between the wheel hub and the rim 16, the outer peripheral portion of the disk, as best shown in Figure 7, may be provided with a radial extension in the form of an annular bead 25. This bead comprises a split expansible and contractible ring made of resilient material and being of a curved cross sectional shape. The inner peripheral portion of the bead 25 is formed into a curved edge 26 which is adapted to engage under a plurality of tangs or teeth 27 blanked out of the outer part of the disc 12'.

In practice, this ring is expanded so that its inner edge 26 can be hooked under the teeth 27, and thereafter upon the contraction of the ring it will tightly embrace the teeth, and thus be held on the disk.

The outer edge of this bead 25 is adapted to engage an inner surface of the rim 16, as is evident from Figure 7. Also, this bead may be provided with any suitable finish, such for example as chromium plate, so as to enhance the appearance of the disk.

Now, in regard to the hub cap part 13 which may be punched from the blank as shown in Figure 4, this part is adapted to be formed into a hub cap such as that shown at 30 in Figure 8. The outer portion of the part 13 may be spun or rolled inwardly into an edge adapted for cooperation with retaining springs on the hub portion of a wheel such as the new disk wheels now being installed on standard automotive vehicles. However, my invention is not to be limited to this particular type of cap, since the part 13 may be formed or rolled into other types of hub caps with equal advantage, as in the case of the one illustrated in Figure 8.

Thus it will be evident that I have provided a method of manufacture, applicable to the making of automobile parts, which enables a plurality of different parts to be formed contemporaneously from a single blank of sheet material, with a saving in both the material used and the labor usually expended in the making and handling of such parts.

I am aware that numerous details of the process may be varied through a wide range without departing from the principles of this invention, and I, therefore, do not purpose limiting the patent granted hereon otherwise than necessitated by the prior art.

I claim as my invention:

1. The method of manufacturing a plurality of concentric ornamental circular members from a single blank of sheet material which consists in applying spring pressure to the outer edges and corners of the blank to hold it in a given forming position, forming an outer portion of the blank, while it is thus held, into an annular plate of curved concave cross section and at the same time forming a central portion into a circular wheel disk of a reversely curved and convex cross section, and shearing said members thus formed from each other.

2. The method of manufacturing an ornamental wheel disk from a blank of sheet material the outer portion of which is formed into an annular tire cover part of curved concave cross section, which consists in depressing an annular portion of the center part of the blank into a reversely and convexly curved wheel disk while the blank is held in position by pressure applied to its outer margins, forming the remaining central portion of the blank into a hub cap part, and shearing the three members thus formed to disconnect them from each other.

3. The method of manufacturing a wheel disk and an annular concave ring from a single blank of material which consists in forming the blank into a circular member having a convexly curved central depressed wheel disk part and into a reversely and concavely channeled annular marginal ring and shearing said ring from said central part at the line of junction of said part and ring.

GEORGE ALBERT LYON.